Figure 1:
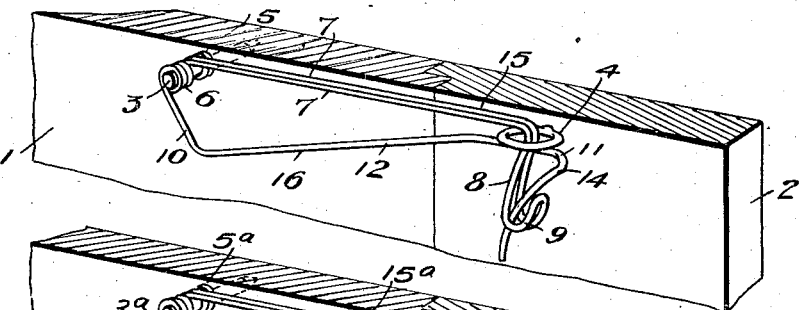

Dec. 16, 1930.  A. B. YANCEY  1,785,468
LATCH
Filed Oct. 31, 1927  6 Sheets-Sheet 1

ARCHELOUS B. YANCEY Inventor

Dec. 16, 1930.  A. B. YANCEY  1,785,468
LATCH
Filed Oct. 31, 1927    6 Sheets-Sheet 2

ARCHELOUS B. YANCEY Inventor

By CA Snow & Co.
Attorneys.

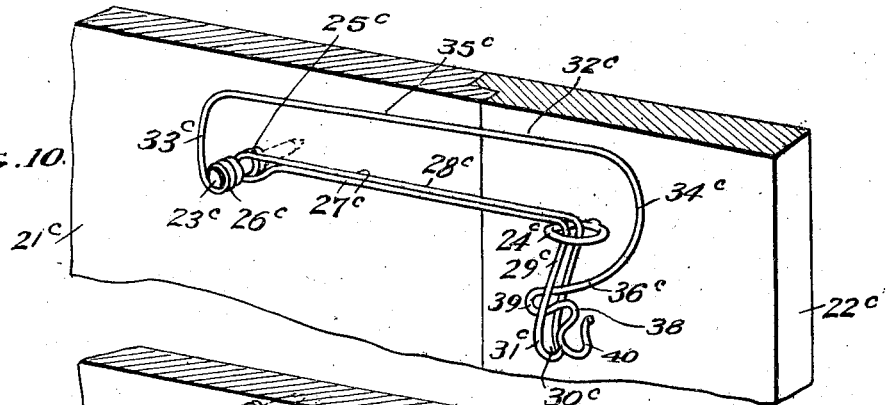
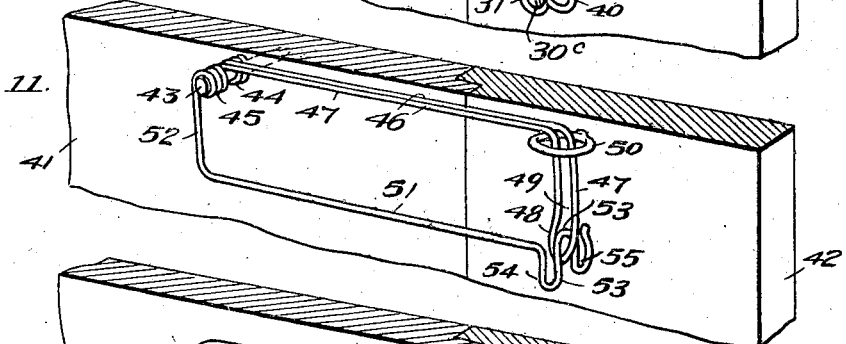
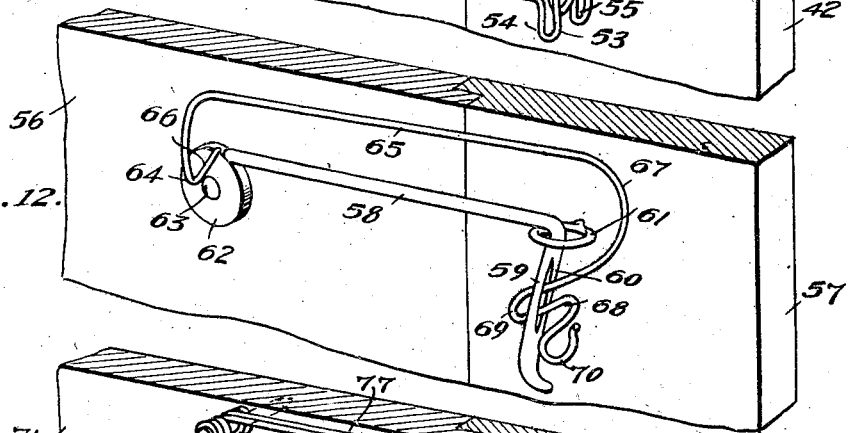
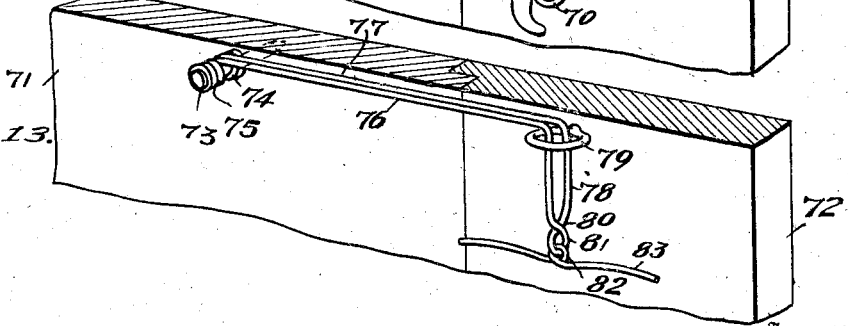

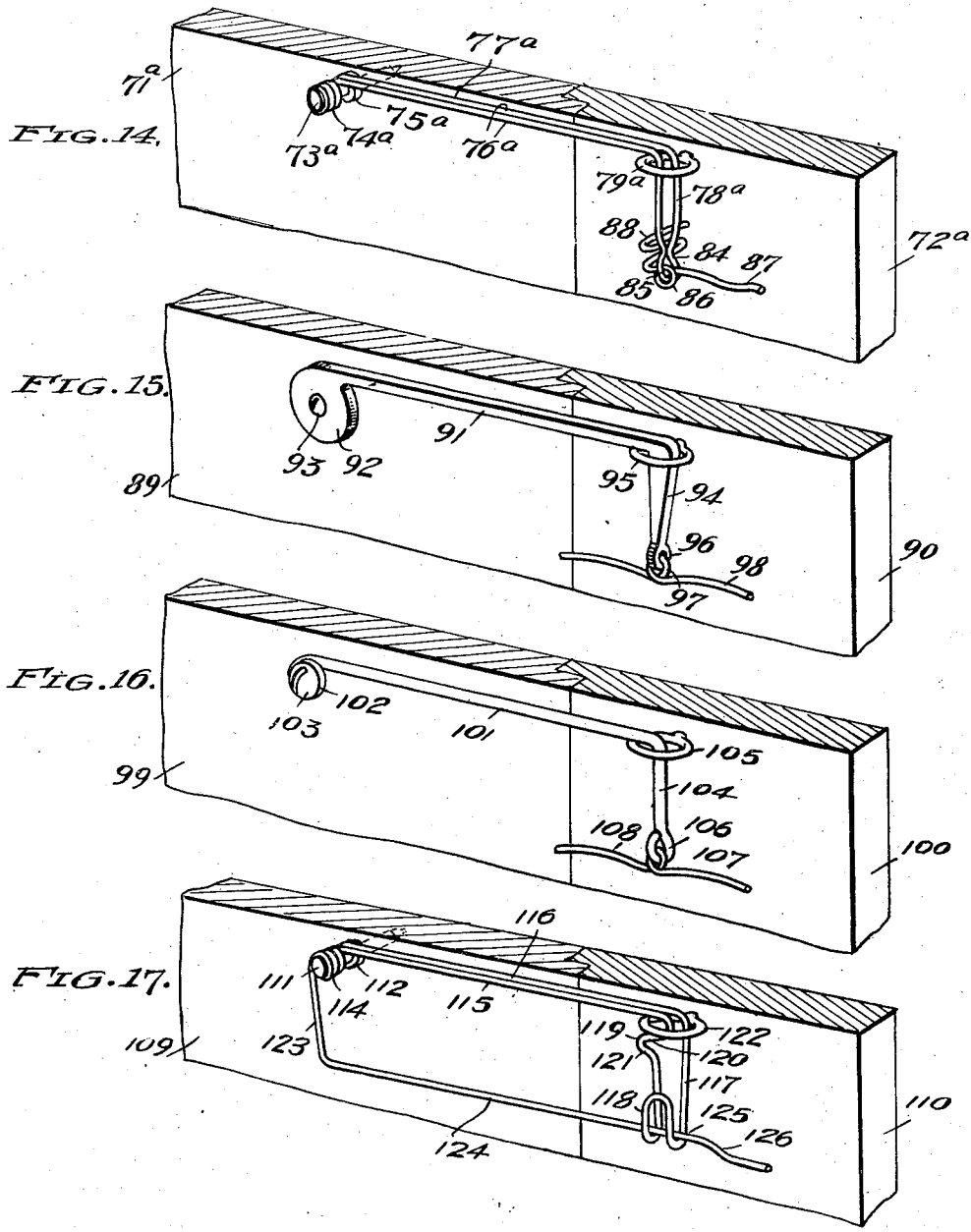

Dec. 16, 1930. A. B. YANCEY 1,785,468
LATCH
Filed Oct. 31, 1927 6 Sheets-Sheet 5
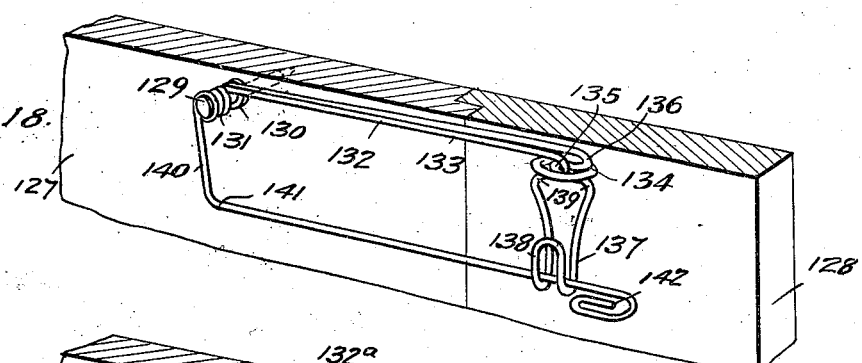
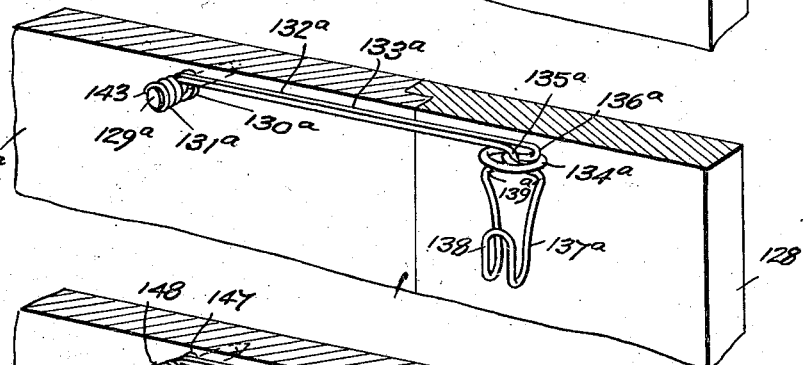
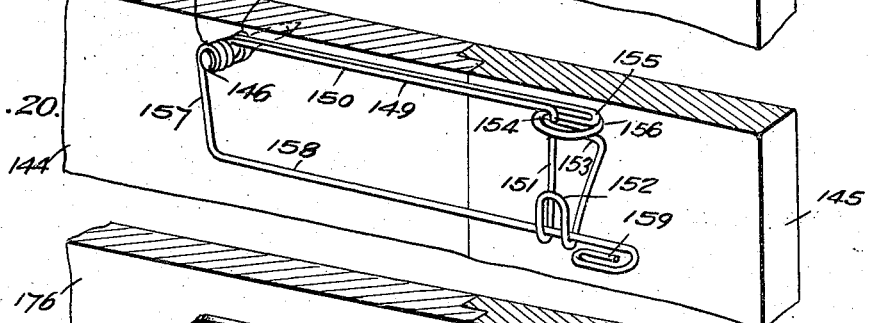
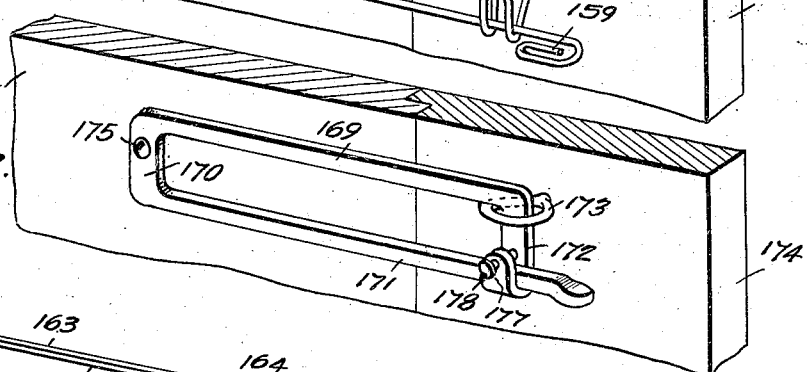
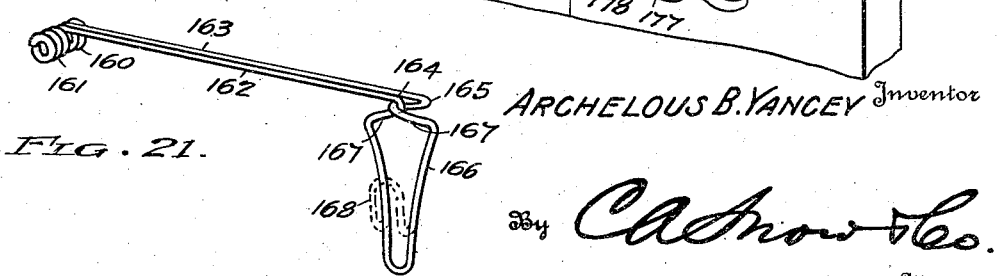
ARCHELOUS B. YANCEY Inventor

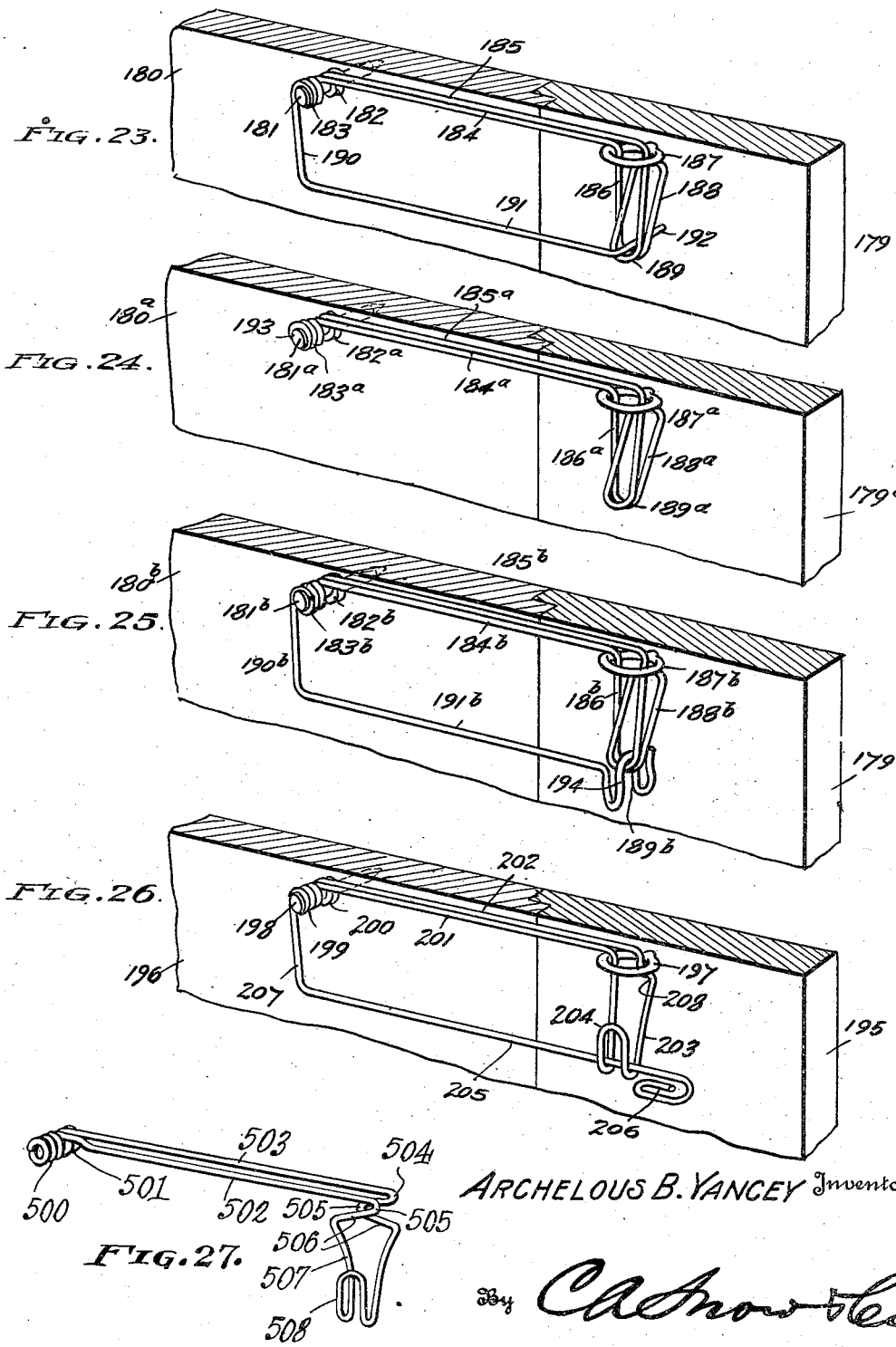

Patented Dec. 16, 1930

1,785,468

UNITED STATES PATENT OFFICE

ARCHELOUS B. YANCEY, OF PASADENA, CALIFORNIA

LATCH

Application filed October 31, 1927. Serial No. 229,934.

This invention aims to provide a simple latch mechanism, made out of wire if desired, and so constructed that doors, lids, and the like, may be held in position securely but releasably.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figures 1 to 27 are perspective views showing various forms of the invention.

In Figure 1 of the drawings, there are shown cooperating members including a frame 1 and a door 2 or other closure cooperating with the frame, the parts 1 and 2 being illustrative of any members adapted to be fastened together by a device of the general sort disclosed in this application. A pivot element 3, which may be a headed nail, is inserted into the frame 1 and stands at right angles to the frame. A loop-shaped keeper 4, such as a screw eye, is mounted on the door 2.

The latch shown in Figure 1 is made preferably from a single piece of resilient wire formed into an inner bearing coil 5 and an outer bearing coil 6, each disposed about the pivot element 3 and held on the pivot element, by the head thereof. The coils 5 and 6 are prolonged at their inner ends to form parallel contacting strips 7 which constitute the body 15 of the latch, the strips 7 being extended to fashion a hook 8 located in the same plane with the strips 7, there being an opening 9 through the bill of the hook 8. The outer end of the bearing coil 6 is extended to form an arm 16, made up of an inner terminal part 10, an outer terminal part 11, and an intermediate portion 12 connecting the parts 10 and 11 of the arm. The parts 10 and 12 of the arm are disposed at an obtuse angle to each other, and the outer terminal part 11 of the arm is located in approximate parallelism to the body 15. The outer terminal part 11 of the arm has a depending reversely concaved finger 14.

In practical operation, the body 15 of the latch is swung down into the position shown in Figure 1, in a plane parallel to the frame 1 and the door 2, the bearing coils 5 and 6 turning on the pivot element 3, and the hook 8 passing downwardly through the keeper 4, into the position depicted in Figure 1. The finger 14 of the arm 16 is inserted downwardly through the opening 9 in the bill of the hook 8, and the outer terminal portion 11 of the arm 16 is engaged beneath the keeper 4, the resiliency of the arm holding the outer terminal portion 11 thereof immediately beneath the keeper 4, so that the body 15 cannot swing upwardly on the pivot element 3 and detach the hook 8 from its engagement with the keeper 4.

Figure 2:
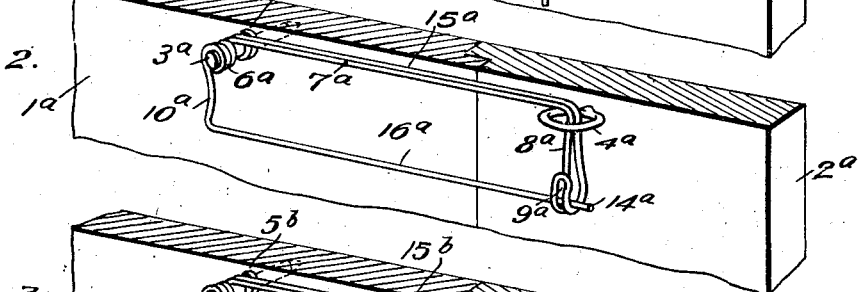

In the form shown in Figure 2 of the drawings, parts hereinbefore described have been designated by numerals previously used, with the suffix "a". In this form of the invention, the hook 8a stands at right angles to the plane in which the body 15a of the latch swings. The arm 16a of the latch is straight, saving for the rectangularly disposed inner terminal part 10a which is joined to the outer bearing coil 6a. The end or finger portion 14a of the arm 6a does not pass through the opening 9a in the hook 8a, but is lodged in the bend or bill of the hook.

Figure 3:
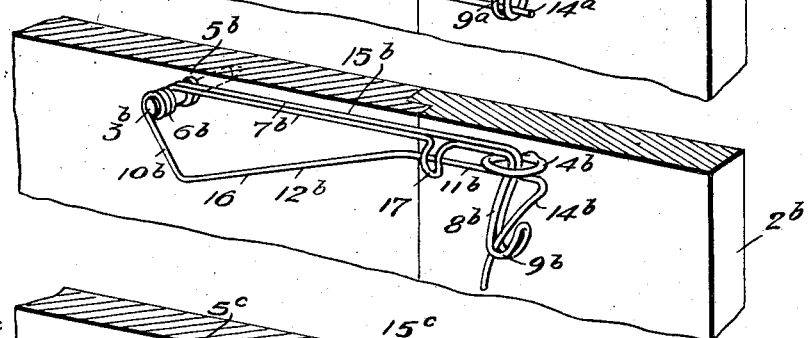

In the form shown in Figure 3, parts hereinbefore described have been designated by numerals previously used, with the suffix "b". The device shown in Figure 3 differs from the one shown in Figure 1, in that, in Figure 3, one of the strips 7b that make up the body 15b of the latch is provided with a loop-shaped, depending, inwardly curved retainer 17 behind which the outer terminal part 11b of the arm 16b is engaged, to hold the part 11b securely but releasably beneath the keeper 4b.

Figure 4:
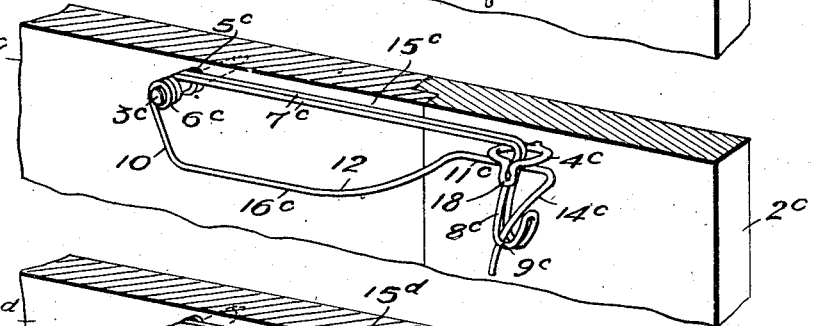

In Figure 4, parts hereinbefore described have been designated by numerals previously used, with the suffix "c". This form of the invention differs from the form shown in Figure 1, in that, in Figure 4, the intermediate part 12c of the arm 16c is convexed downwardly, throughout a part of its length. Moreover, the keeper 4c has a loop-shaped, depending, inwardly curved retainer 18, engaging the outer terminal part 11c of the arm 16c and holding the part 11c securely but releasably in place below the keeper 4c.

Figure 5:
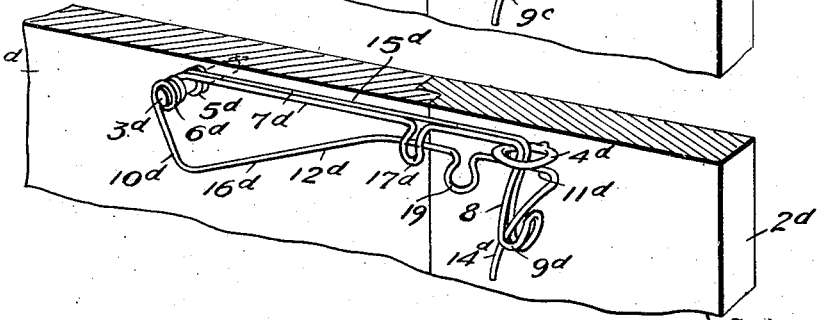

In Figure 5, parts hereinbefore described have been designated by numerals previously used, with the suffix "d". In this form, the outer terminal part 11d of the arm 16d is provided with an off-standing loop-shaped handle 19 whereby the arm 16b can be the more conveniently manipulated.

Figure 6:
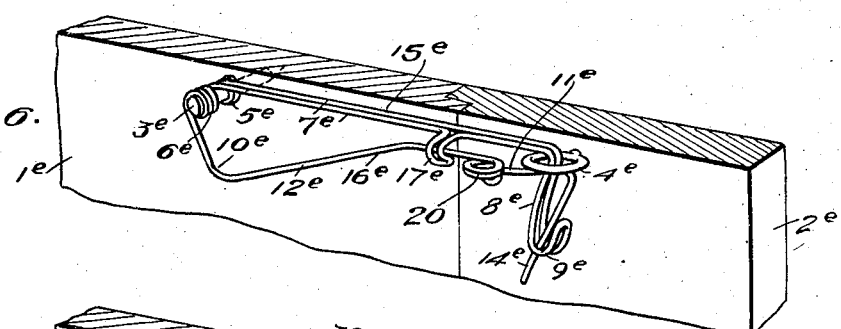

In the form shown in Figure 6, parts hereinbefore described have been designated by numerals previously used, with the suffix "e". The device which appears in Figure 6 is closely allied to the form shown in Figure 5, there being in the outer terminal part 11e of the body 15e, a coiled spring 20. The spring 20 adds resiliency to the arm 16e and helps to hold the end of the part 11e beneath the keeper 4e. The spring 20 also may be used as a finger grip or handle by which the arm 16e can be manipulated readily.

Figure 7:
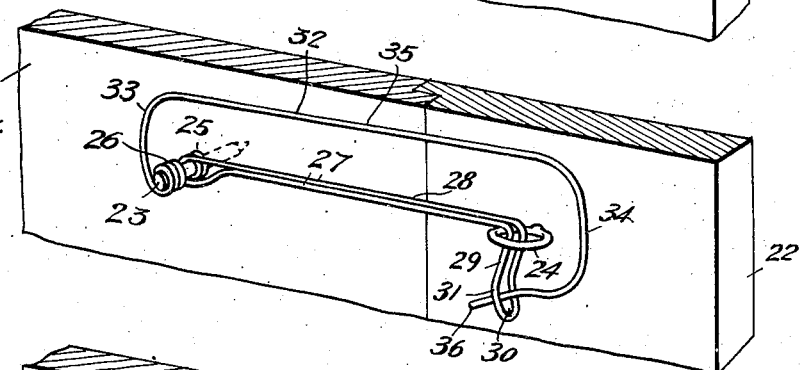

In Figure 7 of the drawings there are shown cooperating members including a frame 21 and a door 22 or other closure cooperating with the frame, the parts 21 and 22 being illustrative of any members adapted to be fastened together by the device shown in this application. A pivot element 23, which may be a headed nail, is inserted into the frame 21 and stands at right angles to the frame. A keeper 24, of loop shape, such as a screw eye, is mounted on the door 22.

The latch shown in Figure 7 is made, preferably, from a single piece of resilient wire formed into an inner bearing coil 25, and an outer bearing coil 26, each disposed about the pivot element 23 and held on the pivot element by the head thereof. The coils 25 and 26 are prolonged at their inner ends to form parallel contacting strips 27 which constitute the body 28 of the latch, the strips 27 being extended to fashion a hook 29 located in the same plane with the strips 27, there being an opening 30 through the bill of the hook 29, the angle 31 which forms the bill of the hook being an obtuse angle. The outer end of the bearing coil 26 is extended to form an arm 32 made up of an inner terminal part 33, an outer terminal part 34, and an intermediate portion 35 connecting the parts 33 and 34 of the arm. The outer terminal part 34 of the arm 32 has a finger 36 which is extended through the opening 30 in the hook 29. In Figures 1 to 6, the arm of the latch is located below the body of the latch, but in Figure 7, the arm 32 is disposed above the body 28 of the latch. The intermediate portion 35 of the arm 32 is located about parallel to the body 28, the outer terminal part 34 of the arm 32 extending downwardly in spaced relation to the keeper 24, and the finger 36 extending rearwardly through the opening 30 in the hook 29, below the keeper 24.

When the parts are arranged as shown in Figure 7, the finger 36 prevents the hook 29 from being detached from the keeper 24, but when the finger 36 is sprung out of the opening 30 in the hook 29, then the body 28 of the latch can be swung upwardly on the pivot element 23, thereby to disengage the hook 29 from the keeper 24.

Figure 8:
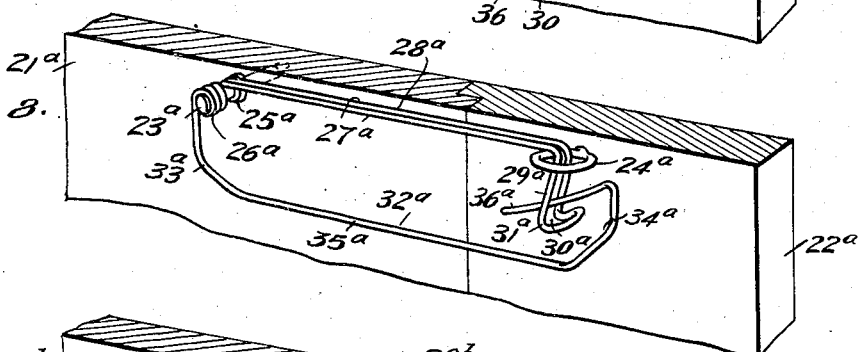

In Figure 8, parts hereinbefore described in connection with Figure 7 are designated by numerals used in Figure 7, with the suffix "a". Here the arm 32a is disposed below the body 28a, the parts 33a and 34a are of angular form, instead of being curved as at 33 and 34 in Figure 7, and the angle 31a in the hook 29a is somewhat more pronounced than is the angle 31 in the hook 29 of Figure 7. The operation of the form shown in Figure 8 may be dismissed with the brief statement that the finger 36 may be disengaged from the opening 30a in the hook 29a, whereupon the arm 28a may be swung to disengage the hook from the keeper 24a.

Figure 9:
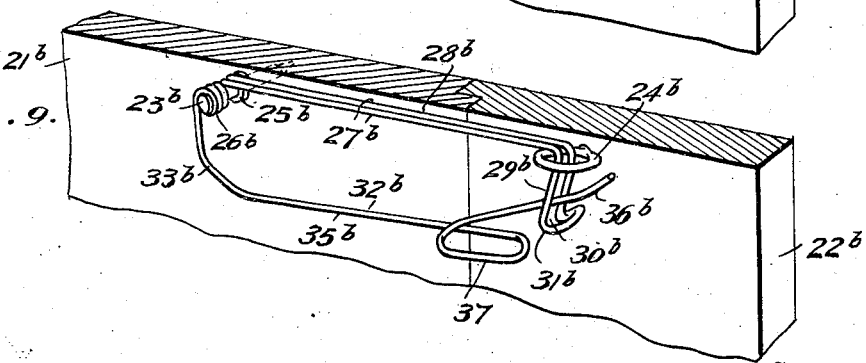

In the form shown in Figure 9, parts hereinbefore described in connection with Figure 8 are designated by numerals previously used, with the suffix "b". In this form of the invention, the finger 36b extends upwardly and forwardly through the opening 30b in the hook 29b, whereas, in Figure 8, the finger 36 extends downwardly and rearwardly through the opening 30a in the hook 29a. In the arm 32b of Figure 9, a loop 37 is formed, and from the loop 37, the finger 36b extends. The loop 37 adds resiliency and also affords a means whereby the arm 32b may be handled conveniently, to spring the finger 36b out of the opening 30b in the hook 29b.

In Figure 10, parts hereinbefore described in connection with Figure 7 have been designated by numerals previously used, with the suffix "c". In the form shown in Figure 10 of the drawings, the finger 36c is supplied with a sigmoidal extension 38 defining a loop-shaped projection 39 received in the opening 30c of the hook 29c, and forming a loop 40 whereby the arm 32c may be manipulated or sprung to disengage the projection 39 from the opening 30c of the hook 29c.

In Figure 11, the frame is shown at 41, and the door at 42. The headed pivot element appears at 43. The inner bearing coil is shown at 44, and the outer bearing coil at 45, these elements being engaged about the pivot element 43. The inner ends of the bearing coils 44 and 45 are extended to form the contacting strips 46 of the body 47, the body terminating in a depending hook or loop 47 located in a plane about parallel to the door 42, the bill of the hook 47 being outwardly inclined away from the door, as shown at 48, the opening through the hook or loop 47 appearing at 49. The loop or hook 47 extends downwardly through a loop-shaped keeper 50 on the door 43. The outer end of the coil 43 is prolonged to form an arm 51 having an inner terminal part 52 which is connected immediately to the coil 45. At its end, the arm 51 has a sigmoidal extension 53 forming a loop 54 and a loop 55, the extension 53 projecting through the opening 49 in the hook 47, the lower end of the part 47 being engaged between the loops 54 and 55. In this form, the sigmoidal extension 53 is disposed approximately at right angles to the door 42, whereas, in Figure 10, the sigmoidal extension 38 is located in approximate parallelism to the door 22c.

In Figure 12, the frame is shown at 56, and the door at 57. The body of the latch is shown at 58 and has a depending hook 59 provided with an opening 60, the hook 59 extending downwardly through a loop-shaped keeper 61 on the door 57. The inner end of the arm 58 is mounted in the edge of a disk 62, which, in its turn, is journaled on a headed pivot element 63 mounted in the frame 56. The parts 62—58—59 afford a construction which may be preferred by some who wish a cast metal latch, rather than a wire latch. There is a V-shaped seat 64 in the outer surface of the disk 62. The arm 65 is constructed much like the arm 35c of Figure 10, and one end of the arm 65, designated by the numeral 66, is so shaped that it can be received in the seat 64 and be secured therein in any desired way. The arm 65 has a part 67, corresponding to the outer terminal member 34c of Figure 10. The sigmoidal extension appears at 68 and corresponds to the part 38 of Figure 10, the extension 68 including one loop 69 engaged in the opening 60 of the hook 59, and another loop 70, which, like the loop 40 of Figure 10, affords a handle for the convenient manipulation of the latch arm.

In Figure 13, the frame is shown at 71 and the door at 72. A headed pivot element 73 is mounted in the door 72, and about the pivot element 73 is engaged an inner bearing coil 74 and an outer bearing coil 75, the inner ends of the coils 74 and 75 being extended to form the contacting strips 76 of a latch body 77 provided at its end with a depending hook 78 engaged in a loop-shaped keeper 79 on the door 72. The side portions of the hook 78 are crossed on each other as at 80, to form an eye 81 which is pivotally engaged with an eye 82 that is fashioned in a shackle bar 83, intermediate the ends of the shackle bar.

The shackle bar 83 prevents the hook 78 from moving upwardly out of engagement with the keeper 79, when the parts are arranged as shown in Figure 13, but if the shackle bar 83 be tilted up in the parallel relation with respect to the hook 78, then the hook can be disengaged from the keeper 79, the shackle bar 83 passing endwise through the keeper 79, when the latch body 77 is swung upwardly on the pivot element 73, the bearing coils 74 and 75 turning on the pivot element 73, in the way described.

In Figure 14, parts hereinbefore described in connection with Figure 13, have been designated by numerals used in Figure 13, with the suffix "a". The hook 78a of Figure 14 is contracted, as at 84, to form an eye 85, pivotally engaged with an eye 86 formed intermediate the ends of a shackle bar 87, one end of the shackle bar 87 being reversely curved to form a stop 88, which, engaging with the hook 78a, holds the shackle bar 87 in such a position that it cannot be drawn through the keeper 79. It is possible, however, to turn up the shackle bar 87 into parallel relation with respect to the hook 78a, and, then, the shackle bar 87 and the bar 88 will pass through the keeper 79a, when the latch body 77 is swung upwardly to disengage the hook 78a from the keeper 79a.

In Figure 15, the frame is shown at 89 and the door at 90. The latch body 91 is formed integrally with a disk 92 mounted to turn on a headed pivot element 93 carried by the frame 89. The latch body 91 has a depending hook 94, extended through a loop-shaped keeper 95 on the door 90. On the lower end of the hook 94 there is an eye 96 which is pivotally engaged with an eye 97 formed in the intermediate portion of a shackle bar 98. The form shown in Figure 15 operates the same as the form shown in Figure 13, but the form depicted in Figure 15 may be resorted to by those who prefer a cast metal construction, rather than a bent wire construction.

In Figure 16, the frame appears at 99 and the door at 100. The body 101 of the latch is made out of heavy wire or rod, turned upon itself to form an eye 102, mounted on a heavy pivot element 103 carried by the door frame 99. The hook 104 on the end of the latch body 101 extends through the keeper 105 on the door 100. At the lower end, the hook 104 has an eye 106 pivotally engaged with an eye 107 formed in the intermediate portion of a shackle bar 108. This form of the invention operates substantially like the form shown in Figure 15, but is offered to those who do not care for the cast metal construction involved in the making of the device of Figure 15.

In Figure 17, the frame is shown at 109 and the door at 110. A headed pivot element 111 is mounted in the frame 109. The inner bearing coil is shown at 112, and the outer bearing coil at 114, the coils 112 and 114 being engaged about the pivot element 111, behind the head thereof. The inner edges of the bearing coils 112 and 114 are prolonged to form the parallel strips 115 of the body 116 of the latch, the body terminating in a depending hook 117 extended downwardly through a loop-shaped keeper 122 mounted in the door 110. The bill 118 of the hook 117 upstands in a direction at right angles to the door 110. One side portion of the hook 117 has a lateral projection 119 formed by an upper inclined member 120, and a lower inclined member 121. The outer end of the outer bearing coil 114 is prolonged to form the inner terminal part 123 of an arm 124, the part 123 being located approximately at right angles to the arm 124. The arm 124 is held resiliently in the bill 118 of the hook 117, the outer terminal part 125 of the arm 124 being off-set slightly, if desired, as shown at 126.

When the hook 117 is pushed downwardly into the keeper 122, as the body 116 swings on the pivot element 111, the keeper 122 rides along the lower inclined member 121 of the projection 119, and the projection 119 engages beneath the keeper 122. Similarly, when the hook 117 is forced upwardly out of the keeper 122, the edge of the keeper 122 rides along the upper inclined member 120 of the projection 119, and the projection 119 is carried to the right in Figure 17, so that the hook 117 may move upwardly out of the keeper 122. Some may prefer to pinch the side portions of the hook 117 together, to permit the projection 119 to move upwardly or downwardly through the keeper 122. The arm 124 is engaged with the bill 118 of the hook 117, and affords a means whereby the hook 117 is held against disengagement from the keeper 122, even though the projection 119 should spring to the right in Figure 17, and move upwardly through the keeper 122.

In Figure 18, the frame is shown at 127 and the door 128. A loop-shaped keeper 134 is mounted on the door 128. The frame 127 carries a headed pivot element 129 about which are engaged the inner bearing coils 130, and the outer bearing coils 131. The inner ends of the coils 130 and 131 are prolonged to form the parallel contacting strips 132 that make up the body 133. The strips 132 of the body 133 are gripped together as at 135, and a loop-shaped projection 136 extends beyond the twist at 135. The projection 136 engages the keeper 134. Below the twist at 135, the material is prolonged to form the hook 137, the bill of the hook being marked by the numeral 138. The upper end of the hook 137 forms shoulders 139 engaged beneath the keeper 134. Owing to the presence of the shoulders 139 and the projection 136, the body 133 of the latch is maintained engaged with the keeper 134, but the hook 137 is compressible enough so that the shoulders 139 can be forced upwardly through the keeper 134. The outer end of the outer bearing coil 131 is continued to form the inner terminal part 140 of the arm 141, the members 140 and 141 being disposed approximately at right angles to each other. The arm 141 rests in the bill 138 of the hook 137 and is yieldably and resiliently held therein. At its outer end, the arm 141 has a handle 142 which may be of coiled form.

In the form shown in Figure 19, parts hereinbefore described in connection with Figure 18 are designated by numerals used in Figure 18, with the suffix "a". In this form of the invention, the inner terminal part 140, the arm 141, and the handle 142 of Figure 18 are omitted, the outer bearing coil 131a terminating at the point shown at 143. In this form of the invention, the projection 136a and the shoulders 139a are relied upon to keep the body 133a of the latch in engagement with the loop-shaped keeper 134a.

In Figure 20, the frame is marked by the numeral 144, and the door is shown at 145. The door 145 carries a loop-shaped keeper 156, and a headed pivot element 146 is mounted on the frame 144. The inner bearing coil 147 and the outer bearing coil 148 are engaged about the pivot element 146. The inner ends of the coils 147 and 148 are continued to form the parallel contacting strips 149 of the body 150 of the latch. The hook is shown at 151 and includes a bill 152. One side portion of the hook 151 is straight, but the other side portion of the hook is laterally and inwardly extended to form a transverse shoulder 153, the shoulder 153 being looped at 154 about the straight side portion of the hook 151 and is continued to form a projection 155 joined to one of the strips 149, the straight side portion of the hook 151 being joined to the other strip 149. The outer end of the outer bearing coil 148 is continued to fashion the inner terminal part 157 of the arm 158, the parts 158 and 157 being disposed approximately at right angles to each other. The arm 158 is held yieldingly and resiliently in the hook 151, and the arm 158 is coiled at its end, as shown at 159, to form a handle. The projection 155 and the shoulder 153 cooperates to maintain the upper portion of the hook yieldably interengaged with the keeper 156, but the shoulder 153 can be forced upwardly through the keeper 156, the hook 151 passing upwardly through the keeper 156, after the arm 158 has been disengaged from the bill 152.

In Figure 21, the inner bearing coil is shown at 160, and the outer bearing coil at 161, the inner ends of the coils 160 and 161 being continued to form the parallel contacting strips 162 of the arm 163. The strips 162 are twisted or crossed together, as at 164, and one of the strips is continued to form a loop-shaped projection 165. Below the twist at 164, the material is continued to form a loop 166, the upper end of which forms shoulders 167, corresponding to the shoulders 139 of Figure 18. In this form of the invention, all parts of the loop 166 are in the same plane, although if the manufacturer prefers, the end of the loop 166 may be turned up as shown in dotted line at 168 to make a hook.

In Figure 22 of the drawings, the device is fashioned in one piece, out of resilient metal, and the wire construction used, for instance, in Figure 20, is not resorted to. In Figure 22, the body 169 and the arm 171 are joined by an end piece 170 which is slightly wider than either of the parts 169 or 171. The body 169 terminates in a hook 172, the bill 177 of which is disposed at right angles to the door 174, the hook 172 extending downwardly through a loop-shaped keeper 173 on the door 174. A pivot element 175 connects the end piece 170 with the frame 176 for swinging movement in a direction parallel to the frame.

A pin or other guard 178 is mounted in the bill 177 of the hook 172 and extends above the arm 171. When the pin 178 is retracted, the arm 171 may be sprung out of the bill 177, and, then, the latch may be swung on the pivot element 175, to carry the hook 172 upwardly through the keeper 173 of the door 174.

In Figure 23, the door appears at 179 and the frame at 180. A keeper 187, of looped form, is mounted in the door 179. A headed pivot element 181 is carried by the frame 180 and is surrounded by an inner bearing coil 182 and an outer bearing coil 183, the inner ends of the coils 182 and 183 being prolonged to form the parallel contacting strips 184 of the body 185. The strips 184 are formed into a depending loop 186 which extends downwardly through the keeper 187. At its lower portion, the constituent material of the main loop 186 is crossed upon itself as at 189, to form an upwardly extended and outwardly inclined auxiliary or terminal loop 188, the upper end of which engages beneath the keeper 187. The outer end of the outer bearing coil 183 is prolonged to form the inner terminal part 190 of the arm 191, the elements 190 and 191 being disposed approximately at right angles to each other. The outer terminal part of the arm 191 is marked by the numeral 192 and is disposed about at right angles to the door 179 when the door is in the closed position depicted in Figure 3. The outer terminal part 192 of the arm 191 extends through the lower part of the main loop 186 and through the lower part of the auxiliary loop 188. In this form of the invention, the body 185 is prevented from swinging upwardly, because the upper end of the auxiliary loop 188 is engaged beneath the keeper 187. The auxiliary loop 188 can be swung over to the left in Figure 23, and then the loops 186 and 188 can be passed upwardly through the keeper 187, if the arm 191 has been swung outwardly, so as to disengage the outer terminal part 192 of the arm 191 from the lower ends of the loops 188 and 186.

In Figure 24 of the drawings, parts hereinbefore described in Figure 23 have been designated by numerals used in Figure 23, with the suffix "a". In this form of the invention, the parts 190, 191, and 192 of Figure 23 are dispensed, and the outer bearing coil 183 is terminated at the point indicated by the numeral 193.

In Figure 25 of the drawings, parts hereinbefore described in connection with Figure 23, have been designated by numerals used in Figure 23, with the suffix "b". In this form of the invention the modification consists in forming the outer terminal part of the arm 191b of the latch in sinuous shape, so as to make an inverted U-shaped seat 194, wherein the lower portions of the loops 188b and 186b on the body 184b are received.

In Figure 26 of the drawings, the door is marked by the numeral 195 and the frame is shown at 196. A keeper 197 is mounted on the door 195, and a headed pivot element 198 is mounted on the frame 196. The outer bearing coil 199 and the inner bearing coil 200 are engaged around the pivot element 198. The inner ends of the coils 199 and 200 are continued to fashion the parallel contacting strips 201 of the arm 202, the arm terminating in an open loop-shaped hook 203, the bill 204 of which outstands with respect to the door 195. The outer end of the arm 205 rests in the bill 204 of the hook 203, and terminates in a coiled handle 206. The inner terminal part 207 of the arm 205 is disposed about at right angles to the body portion of the arm 205, the inner terminal part 207 being joined to the outer end of the outer bearing coil 199. In this form of the invention, the outer side portion of the hook 203 is offset to constitute a shoulder 208 which engages releasably beneath the keeper 197, the construction being such that by the application of a little force, the shoulder 208 may be made to clear the keeper, when the hook 203 moves upwardly through the keeper, after the arm 205 has been disengaged from the bill 204 of the hook 203.

In Figure 27 there is shown a structure which, especially, is a modification of the forms shown in Figures 18, 19, 20, and 21. The inner bearing coil is shown at 501 and the outer bearing coil at 500, the coil 501 being prolonged to form a strip 503 and the coil 500 is prolonged to form a strip 502, the strips 503 and 502 constituting the body. The loop-shaped projection on the strip 503 is shown at 504. The loop-shaped parts 505 are not under engaged or twisted together as shown at 135 in Figure 18. The parts 505 diverge as at 506 and are extended downwardly to form a hook 507, the bill of which is marked by the numeral 508.

What is claimed is:—

1. A latch made from a single piece of resilient material formed into an inner bearing coil and an outer bearing coil, a pivot element on which the coils are mounted, the coils being prolonged at their inner ends to form approximately parallel strips which constitute the body of the latch, the strips being extended to fashion a loop-shaped member disposed at an angle to the body, a keeper through which the loop-shaped member passes, the outer end of the outer bearing coil being extended to form an arm comprising an inner terminal part and an outer terminal part disposed at an angle to each other, the outer terminal part being engaged with said loop-shaped member.

2. A latch made from a single piece of resilient material formed into an inner bearing coil and an outer bearing coil, a pivot element on which the coils are mounted, the coils being prolonged to form strips which constitute the body of the latch, the strips being extended to fashion a loop-shaped member disposed at an angle to the body, a keeper through which the loop-shaped member passes, the outer bearing coil being extended to form an arm engaged with the loop-shaped member.

3. A latch made from a single piece of resilient material formed into an inner bearing coil and an outer bearing coil, a pivot element on which the coils are mounted, the coils being prolonged to form strips which constitute the body of the latch, the strips being extended to fashion the side portions of a loop-shaped member disposed at an angle to the body, a keeper through which the loop-shaped member passes, the outer bearing coil being extended to form an arm which projects between the aforesaid side portions of the loop-shaped member.

4. A latch made from a single piece of resilient material formed into an inner bearing coil and an outer bearing coil, a pivot element on which the coils are mounted, the coils being prolonged to form strips which constitute the body of the latch, the strips being extended to fashion a main loop-shaped member, a keeper through which the main loop-shaped member extends, the main loop-shaped member being bent upon itself to form an auxiliary loop-shaped member extended in an opposite direction to the main loop-shaped member and cooperating yieldably with the keeper to prevent the disengagement of the main loop-shaped member from the keeper, the outer bearing coil being extended to form an arm engaged with one of the loop-shaped members.

5. In a device of the class described, a keeper, and a latch comprising a pivotally mounted body having a loop-shaped main member disposed at an angle to the body and extended through the keeper, the loop-shaped main member being crossed upon itself to form an auxiliary loop-shaped member extended in an opposite direction to the main loop-shaped member and cooperating with the keeper to hold the main loop-shaped member releasably engaged with the keeper.

6. A latch made from a single piece of resilient material formed into an inner bearing coil and an outer bearing coil, a pivot element on which the coils are mounted the coils being prolonged to form strips which constitute the body of the latch, the strips being extended to fashion a main loop-shaped member, a keeper through which the main loop-shaped member extends, the main loop-shaped member being bent upon itself to form an auxiliary loop-shaped member extended in an opposite direction to the main loop-shaped member and cooperating yieldably with the keeper to prevent the disengagement of the main loop-shaped member from the keeper, the outer bearing coil being extended to form an arm having a sinuous terminal defining a seat which is engaged with both of said loop-shaped members.

7. In a device of the class described, a keeper, and a latch comprising a pivotally mounted body having a loop-shaped main member disposed at an angle to the body and extended through the keeper, the loop-shaped main member being crossed upon itself to form an auxiliary loop-shaped member extended in an opposite direction to the main loop-shaped member and cooperating with the keeper to hold the main loop-shaped member releasably engaged with the keeper, the body having an arm which extends through one of the loop-shaped member.

8. In a device of the class described, a keeper, and a latch comprising a pivotally mounted body having a loop-shaped main member disposed at an angle to the body and extended through the keeper, the loop-shaped main member being crossed upon itself to form an auxiliary loop-shaped member extended in an opposite direction to the main loop-shaped member and cooperating with the keeper to hold the main loop-shaped member releasably engaged with the keeper, the body having an arm extended through the loop-shaped members, the arm having an inverted U-shaped seat that engages both of the loop-shaped members.

In testimony that I claim the foregoing as my own, I have hereto affixed my signature.

ARCHELOUS B. YANCEY.